US012535088B2

(12) United States Patent
Sugiyama et al.

(10) Patent No.: US 12,535,088 B2
(45) Date of Patent: Jan. 27, 2026

(54) HYDRAULIC CIRCUIT

(71) Applicants: JATCO Ltd, Fuji (JP); NISSAN MOTOR CO., LTD., Yokohama (JP)

(72) Inventors: Koshiro Sugiyama, Isehara (JP); Takurou Kawasumi, Ebina (JP); Yoshihisa Kodama, Sagamihara (JP); Daisuke Yanagawa, Sagamihara (JP); Kenji Sakakibara, Sagamihara (JP); Kenji Kojima, Atsugi (JP); Sorami Minamizawa, Tokyo (JP)

(73) Assignees: JATCO Ltd, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/843,076

(22) PCT Filed: Mar. 1, 2023

(86) PCT No.: PCT/JP2023/007692
§ 371 (c)(1),
(2) Date: Aug. 30, 2024

(87) PCT Pub. No.: WO2023/167261
PCT Pub. Date: Sep. 7, 2023

(65) Prior Publication Data
US 2025/0172163 A1    May 29, 2025

(30) Foreign Application Priority Data

Mar. 2, 2022   (JP) ................... 2022-032200

(51) Int. Cl.
*F15B 13/04*    (2006.01)
(52) U.S. Cl.
CPC ................. *F15B 13/0401* (2013.01)

(58) Field of Classification Search
CPC .... F15B 13/0401; F16H 61/143; F16H 61/14; F16H 45/02
See application file for complete search history.

(56) References Cited

U.S. PATENT DOCUMENTS

| | | | | |
|---|---|---|---|---|
| 4,585,102 A | * | 4/1986 | Sugano | F16H 61/14 192/3.29 |
| 4,989,702 A | * | 2/1991 | Yoshimura | F16H 61/143 192/3.29 |

(Continued)

FOREIGN PATENT DOCUMENTS

JP    2007-016833 A    1/2007

*Primary Examiner* — Patrick C Williams
(74) *Attorney, Agent, or Firm* — Foley & Lardner LLP

(57) ABSTRACT

A hydraulic circuit including: a torque converter control valve, and a lock-up control valve, in which the lock-up control valve includes a valve body that is displaceable in an axial direction, an actuator that causes the valve body to displace toward a first valve position on one side in the axial direction, an urging member that causes the valve body to displace toward a second valve position on the other side in the axial direction, a first port to which oil having a line pressure as a source pressure is supplied, a second port that communicates with a first oil passage connected to the piston oil chamber, a third port that communicates with the first oil passage, and a drain port, the valve body is displaceable between the first valve position and the second valve position, the first valve position allowing the first port and the second port to communicate with each other, the second valve position allowing the second port and the drain port to communicate with each other, and oil flowing in from the third port urges the valve body toward the second valve position.

10 Claims, 6 Drawing Sheets

(56) References Cited

U.S. PATENT DOCUMENTS

| | | | | |
|---|---|---|---|---|
| 6,419,059 B1* | 7/2002 | Nobu | ............... | F16H 57/04 |
| | | | | 192/3.3 |
| 7,650,973 B2 | 1/2010 | Tsukamoto et al. | | |
| 2001/0004621 A1* | 6/2001 | Suzuki | ............... | F16H 61/0009 |
| | | | | 475/116 |
| 2008/0113839 A1* | 5/2008 | Nozaki | ............... | F16H 61/143 |
| | | | | 475/31 |
| 2009/0241531 A1* | 10/2009 | Noda | ............... | F16H 61/143 |
| | | | | 60/470 |
| 2014/0097056 A1* | 4/2014 | Son | ............... | F16H 45/02 |
| | | | | 192/3.29 |

* cited by examiner

HYDRAULIC CIRCUIT

TECHNICAL FIELD

The present invention relates to a hydraulic circuit.

BACKGROUND ART

Patent Document 1 discloses a torque converter with a lock-up device. Patent Document 1 discloses a hydraulic circuit in which the torque converter has three hydraulic paths.

PRIOR ART DOCUMENT

Patent Document

Patent Document 1: JP2007-16833A

SUMMARY OF INVENTION

In a transmission including a torque converter having three hydraulic paths, improvement in controllability of a lock-up device is required.

According to an aspect of the present invention, a hydraulic circuit is provided including:
  a torque converter control valve configured to control oil supplied to a torque converter; and
  a lock-up control valve configured to control oil supplied to a piston oil chamber of the torque converter, in which the lock-up control valve includes
  a valve body that is displaceable in an axial direction,
  an actuator that causes the valve body to displace toward a first valve position on one side in the axial direction,
  an urging member that causes the valve body to displace toward a second valve position on the other side in the axial direction,
  a first port to which oil having a line pressure as a source pressure is supplied,
  a second port that communicates with a first oil passage connected to the piston oil chamber,
  a third port that communicates with the first oil passage, and
  a drain port,
  the valve body is displaceable between the first valve position and the second valve position, the first valve position allowing the first port and the second port to communicate with each other, the second valve position allowing the second port and the drain port to communicate with each other, and oil flowing in from the third port urges the valve body toward the second valve position.

According to the aspect of the present invention, the controllability of the lock-up device can be improved.

DESCRIPTION OF EMBODIMENTS

Hereinafter, embodiments of the present invention will be described.

Figure 1:
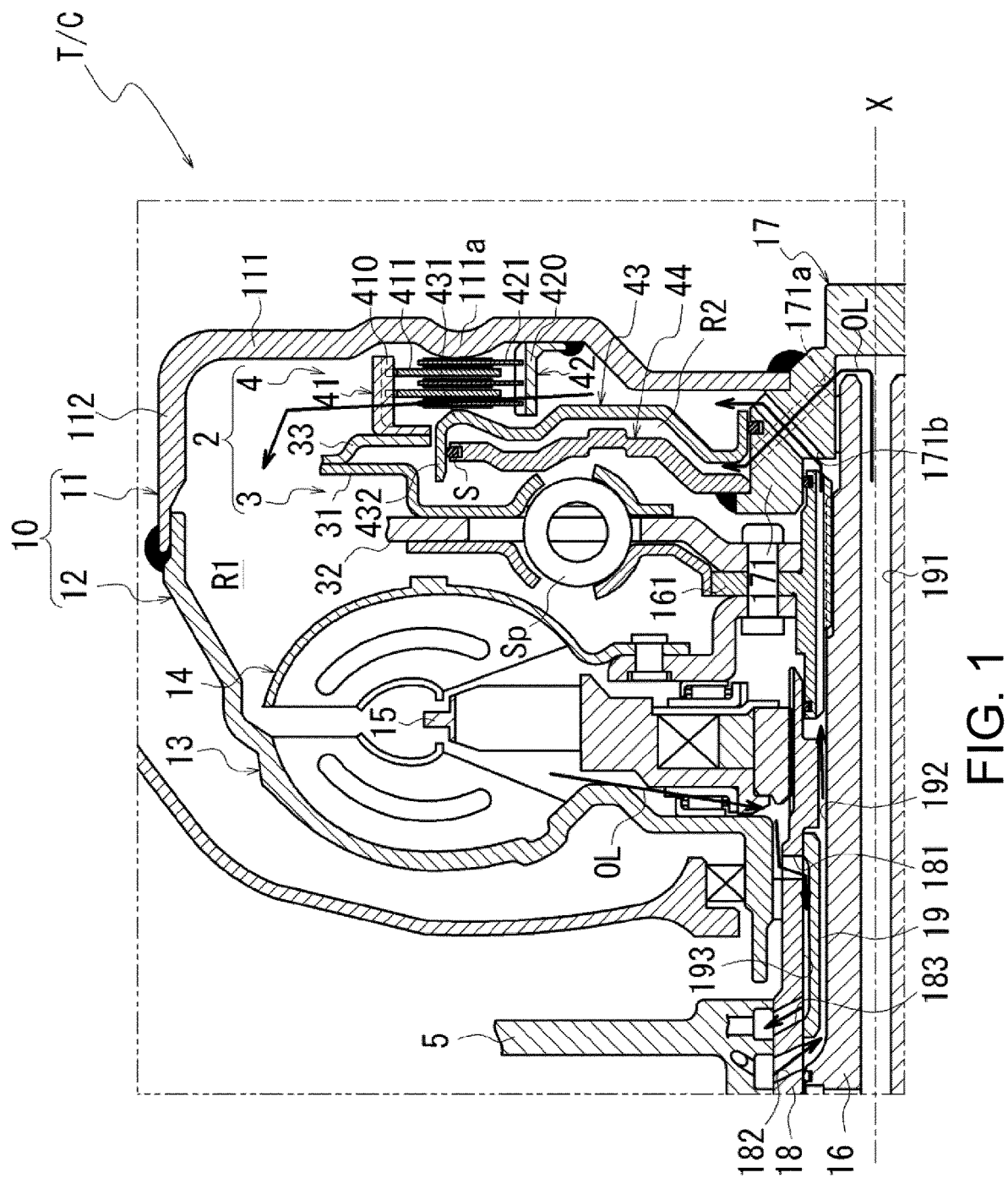
FIG. 1 is a diagram illustrating a schematic configuration of a torque converter.

FIG. 1 is a diagram illustrating a schematic configuration of a torque converter T/C to which hydraulic pressure (oil) for operation is supplied from a hydraulic circuit according to this invention. The torque converter T/C has three hydraulic supply paths.

As illustrated in FIG. 1, inside a cover converter 10 of the torque converter T/C, a pump impeller 13 and a turbine runner 14 are provided to be relatively rotatable on a common rotation axis X. The pump impeller 13 and the turbine runner 14 face each other in a direction of the rotation axis X with a stator 15 interposed therebetween.

The cover converter 10 is formed by assembling a front cover 11 to which a rotational driving force of a driving source is input and a rear cover 12 in the direction of the rotation axis X. The pump impeller 13 is integrally formed on an inner periphery of the rear cover 12.

When the rotational driving force of the driving source is input to the front cover 11, the pump impeller 13 rotates around the rotation axis X. The inside of the cover converter 10 is an oil chamber R1 to which oil OL is supplied, and the rotation of the pump impeller 13 is transmitted to the turbine runner 14 via the oil OL in the oil chamber R1.

An inner diameter side of the turbine runner 14 is coupled to a turbine hub 161. The turbine hub 161 is spline-fitted to an input shaft 16 of a transmission mechanism (not illustrated).

Therefore, the rotational driving force transmitted to the turbine runner 14 is input to a transmission mechanism (not illustrated) side via the input shaft 16.

The front cover 11 includes a wall portion 111 that has a substantially circular shape when viewed in the direction of the rotation axis X, and a peripheral wall portion 112 that surrounds the entire circumference of an outer peripheral edge of the wall portion 111.

Inside the cover converter 10, a lock-up device 2 is located between the turbine runner 14 and the wall portion 111. The lock-up device 2 includes a damper mechanism 3 and a clutch mechanism 4.

The damper mechanism 3 includes a drive plate 31 and a driven plate 32.

The drive plate 31 and the driven plate 32 are provided to be relatively rotatable on the common rotation axis X. The drive plate 31 and the driven plate 32 are coupled to each other in a rotation transmittable manner via a spring Sp provided along a circumferential direction around the rotation axis X.

The driven plate 32 is located on a turbine runner 14 side (left side in the drawing) when viewed from the drive plate 31. An inner diameter side of the driven plate 32 is coupled to the turbine hub 161 in a relatively non-rotatable manner.

A clutch drum 41 of the clutch mechanism 4 is coupled to a surface of the drive plate 31 on a wall portion 111 side via a connection plate 33.

The clutch mechanism 4 includes the clutch drum 41 that rotates integrally with the drive plate 31, and a clutch hub 42 that rotates integrally with the front cover 11.

The clutch drum 41 and the clutch hub 42 are formed in a bottomed cylindrical shape. When viewed in the direction of the rotation axis X, the clutch drum 41 and the clutch hub 42 are provided such that cylindrical peripheral wall portions 410 and 420 thereof are spaced apart from each other in a radial direction of the rotation axis X.

Outer diameter side friction plates 411 are spline-fitted to an inner periphery of the peripheral wall portion 410 of the clutch drum 41. Inner diameter side friction plates 421 are spline-fitted to an outer periphery of the peripheral wall portion 420 of the clutch hub 42.

The outer diameter side friction plates 411 and the inner diameter side friction plates 421 are movable in the direction of the rotation axis X, and the outer diameter side friction plates 411 and the inner diameter side friction plates 421 are alternately provided in the direction of the rotation axis X.

A piston 43 and a plunger 44 are located on a drive plate 31 side (left side in the drawing) in a region where the outer diameter side friction plates 411 and the inner diameter side friction plates 421 are provided.

The piston 43 has a ring shape when viewed in the direction of the rotation axis X. The piston 43 is externally fitted onto a cylindrical support portion 171 of a support member 17. The support member 17 is fixed to the wall portion 111, and the piston 43 is displaceable in the direction of the rotation axis X in a state in which relative rotation around the rotation axis X with respect to the support portion 171 is allowed.

In the piston 43, a pressing portion 431 is provided in a region facing the outer diameter side friction plates 411 and the inner diameter side friction plates 421 described above. The pressing portion 431 protrudes to a clutch mechanism 4 side (right side in the drawing).

The piston 43 has a peripheral wall portion 432 on an outer diameter side of the pressing portion 431. The peripheral wall portion 432 is formed by bending a region of the piston 43 beyond the pressing portion 431 toward a damper mechanism 3 side. When viewed in the direction of the rotation axis X, the peripheral wall portion 432 has a ring shape that surrounds the rotation axis X at intervals.

The plunger 44 is located on the damper mechanism 3 side (left side in the drawing) when viewed from the piston 43. An inner periphery of the plunger 44 is welded to an outer periphery of the support portion 171. An outer periphery of the plunger 44 faces an inner periphery of the peripheral wall portion 432 of the piston 43 with a gap in the radial direction therebetween.

A seal material S is externally fitted on the outer periphery of the plunger 44. The gap between the inner periphery of the peripheral wall portion 432 and the outer periphery of the plunger 44 is sealed by the seal material S.

The plunger 44 forms an oil chamber R2 (piston oil chamber) on a back surface (lock-up device 2) side of the piston 43.

On an inner diameter side of the oil chamber R2, an oil hole 171a is opened in the outer periphery of the support portion 171. In the support portion 171, the oil hole 171a is located in a region between the plunger 44 and the piston 43. The oil hole 171a communicates the oil chamber R2 with an oil passage 191 formed in the input shaft 16.

In the present embodiment, hydraulic pressure for driving the piston 43 is supplied from a hydraulic circuit to be described later to the oil passage 191.

On the outer periphery of the support portion 171, an oil hole 171b is opened in a region between the piston 43 and the wall portion 111. The oil hole 171b allows the oil chamber R1 in the cover converter 10 and an oil passage 192 to communicate with each other. The oil passage 192 is provided using a gap between an outer periphery of the input shaft 16 and a stator shaft 18.

The oil passage 192 communicates with an oil passage in a dummy cover 5 via an oil hole 182 provided in the stator shaft 18.

In the present embodiment, hydraulic pressure for operating the torque converter T/C is supplied to the oil passage 192 from the hydraulic circuit to be described later.

A cylindrical member 19 is inserted into an inner periphery of the stator shaft 18, and an oil passage 193 is formed between the inner periphery of the stator shaft 18 and the cylindrical member 19.

The oil passage 193 communicates with the oil chamber R1 via an oil hole 181 provided in the stator shaft 18. Further, the oil passage 193 communicates with the oil passage in the dummy cover 5 via an oil hole 183 provided in the stator shaft 18.

In the present embodiment, the oil OL supplied into the oil chamber R1 of the torque converter T/C is returned to a hydraulic circuit side to be described later via the oil passage 193.

In the torque converter T/C, the piston 43 is caused to displace in the direction of the rotation axis X using a differential pressure between the oil chamber R1 and the oil chamber R2.

When an oil pressure is supplied to the oil chamber R2, the piston 43 displaces to the wall portion 111 side (right side in the drawing). Thus, the outer diameter side friction plate 411 and the inner diameter side friction plate 421 are gripped between the piston 43 and a pressed portion 111a of the wall portion 111, and relative rotation between the outer diameter side friction plate 411 and the inner diameter side friction plate 421 is regulated according to a pressing force of the piston 43.

When the relative rotation between the outer diameter side friction plate 411 and the inner diameter side friction plate 421 is completely regulated, the lock-up device 2 enters an engaged state.

When the lock-up device 2 enters the engaged state, the torque converter T/C enters a lock-up state in which the front cover 11 and the drive plate 31 are engaged in a relatively non-rotatable manner. In the lock-up state, the rotational driving force of the driving source input to the front cover 11 is directly transmitted to the input shaft 16 via the clutch mechanism 4 and the damper mechanism 3.

When supply of the oil OL to the oil chamber R2 is shut off and a pressure in the oil chamber R2 becomes lower than a pressure in the oil chamber R1, the piston 43 displaces to the damper mechanism 3 side (left side in the drawing), and the relative rotation between the outer diameter side friction plate 411 and the inner diameter side friction plate 421 is allowed.

When the relative rotation between the outer diameter side friction plate 411 and the inner diameter side friction plate 421 is allowed, the lock-up device 2 enters a released state.

When the lock-up device 2 enters the released state, the torque converter T/C enters a converter state in which the front cover 11 and the drive plate 31 relatively rotate. In the converter state, the rotational driving force of the driving source input to the front cover 11 is transmitted from the pump impeller 13 to the turbine runner 14 via the oil in the oil chamber R1, and then transmitted to the input shaft 16.

Figure 2:
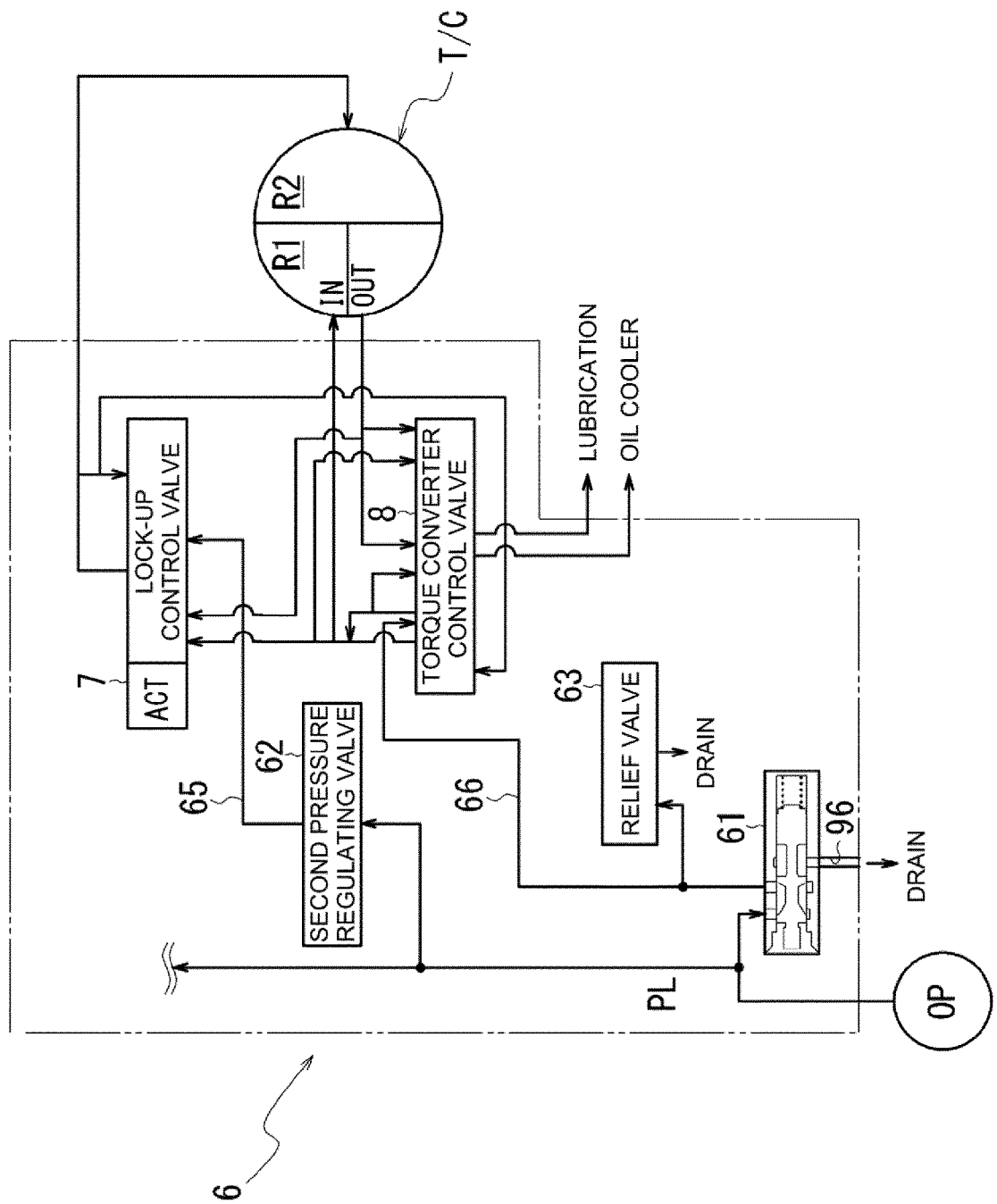
FIG. 2 is a diagram illustrating an example of a hydraulic circuit.

FIG. 2 is a diagram illustrating an example of a hydraulic circuit 6, and is a diagram schematically illustrating a portion related to pressure regulating of the hydraulic pressure supplied to the torque converter T/C in the hydraulic circuit 6.

The hydraulic circuit 6 regulates an operational hydraulic pressure of the torque converter T/C based on a hydraulic pressure (source pressure) generated by an oil pump OP.

The hydraulic circuit 6 has a basic configuration in which a separate plate is sandwiched between valve bodies.

In the valve body, an oil groove and a valve body accommodating groove are provided on a surface facing the separate plate. By overlapping the valve bodies, a sleeve which is a cylindrical space for accommodating the valve body is formed.

A first pressure regulating valve 61 (regulator valve) regulates a line pressure PL based on the hydraulic pressure generated by the oil pump OP by regulating a drain amount of the oil OL in the first pressure regulating valve 61.

The line pressure PL regulated by the first pressure regulating valve 61 is regulated by a second pressure regulating valve 62 and then supplied to a lock-up control valve 7 via an oil passage 65.

The lock-up control valve 7 switches supply and shutoff of the oil OL to the oil chamber R2 of the torque converter T/C in accordance with a command from a control device (not illustrated). Accordingly, a state of the lock-up device 2 is switched between the engaged state and the released state.

Further, the oil OL regulated by the first pressure regulating valve 61 is supplied to a torque converter control valve 8 via an oil passage 66. A relief valve 63 is provided in the middle of the oil passage 66.

The torque converter control valve 8 is a switching valve that switches a supply path of the oil OL supplied from the first pressure regulating valve 61.

When the lock-up device 2 is in the released state, the torque converter control valve 8 supplies the oil OL supplied from a first pressure regulating valve 61 side to an input port IN of the oil chamber R1 of the torque converter T/C. The oil OL returned from an output port OUT of the oil chamber R1 is supplied to an oil cooler (not illustrated).

When the lock-up device 2 is in the engaged state, the torque converter control valve 8 supplies most of the oil OL supplied from the first pressure regulating valve 61 side to the oil cooler (not illustrated).

Figure 3:
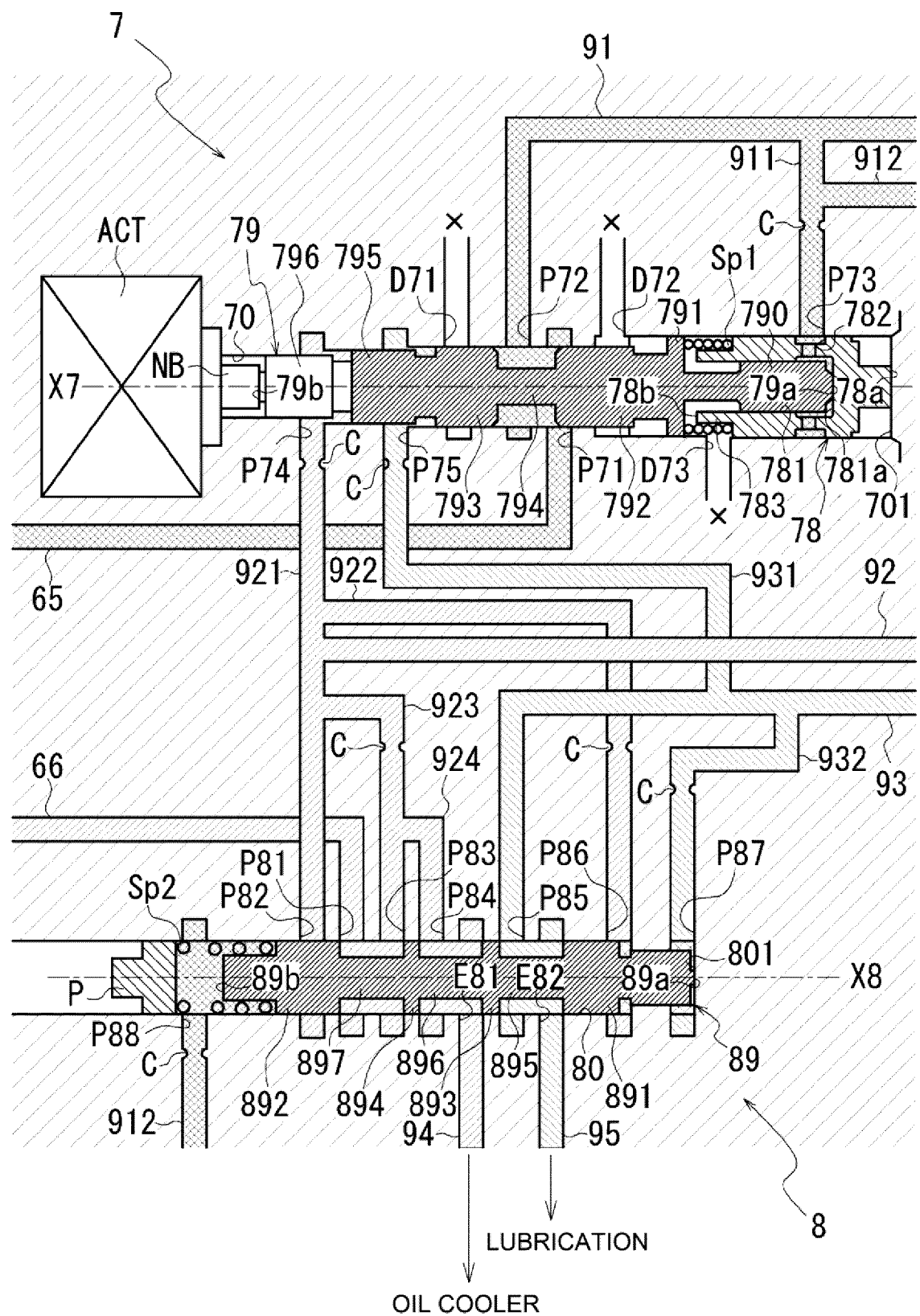
FIG. 3 is a schematic diagram illustrating a configuration of a lock-up control valve and a torque converter control valve.

FIG. 3 is a diagram illustrating configurations of the lock-up control valve 7 and the torque converter control valve 8.

Figure 4:
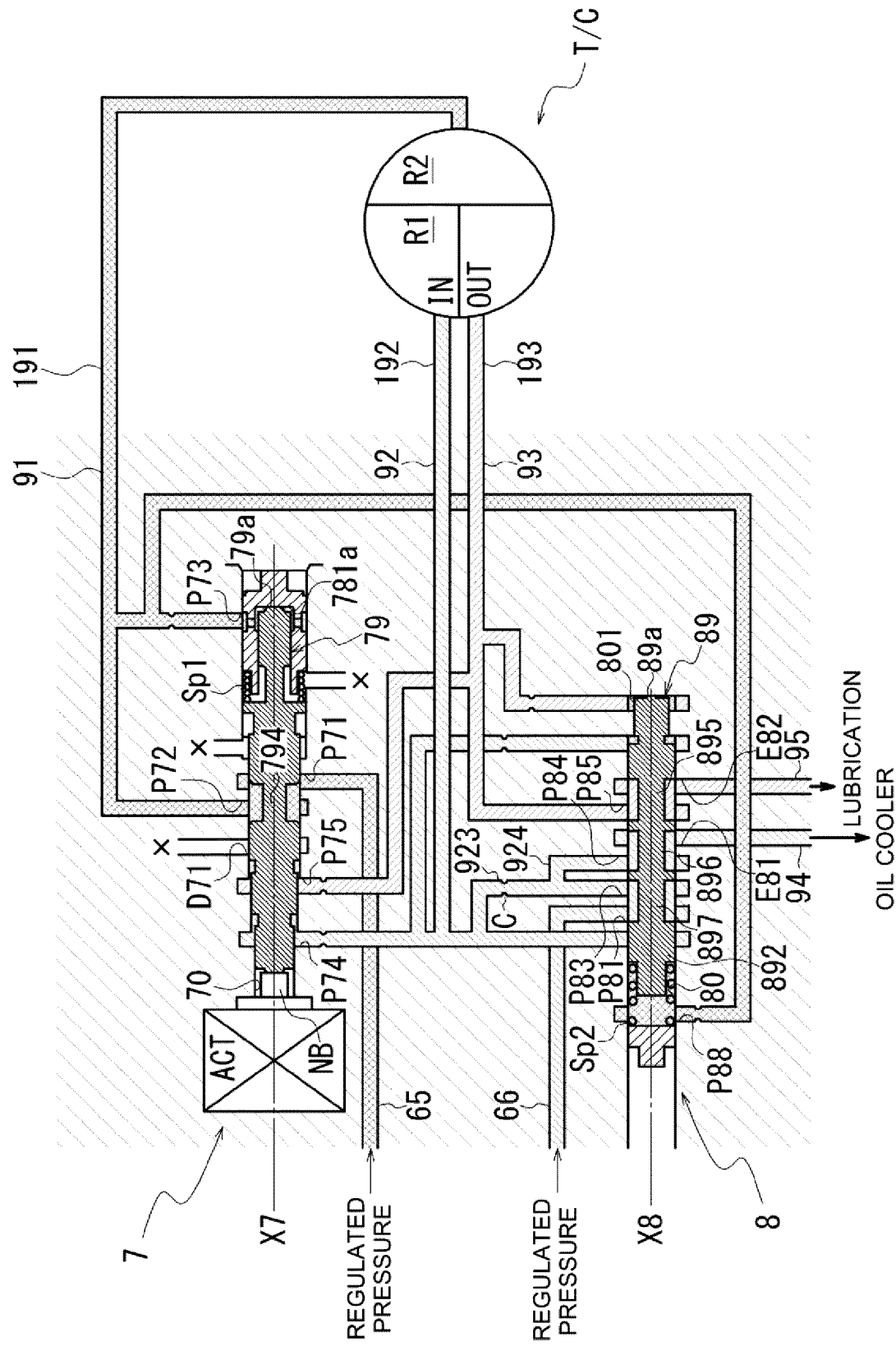
FIG. 4 is a diagram illustrating a flow of oil in the hydraulic circuit when the lock-up control valve is disposed at a first valve position.

FIG. 4 is a diagram illustrating a flow of oil in the hydraulic circuit 6 when a valve body 79 of the lock-up control valve 7 is disposed at a first valve position. In FIG. 4, a valve body 89 of the torque converter control valve 8 is disposed at a third valve position.

Figure 5:
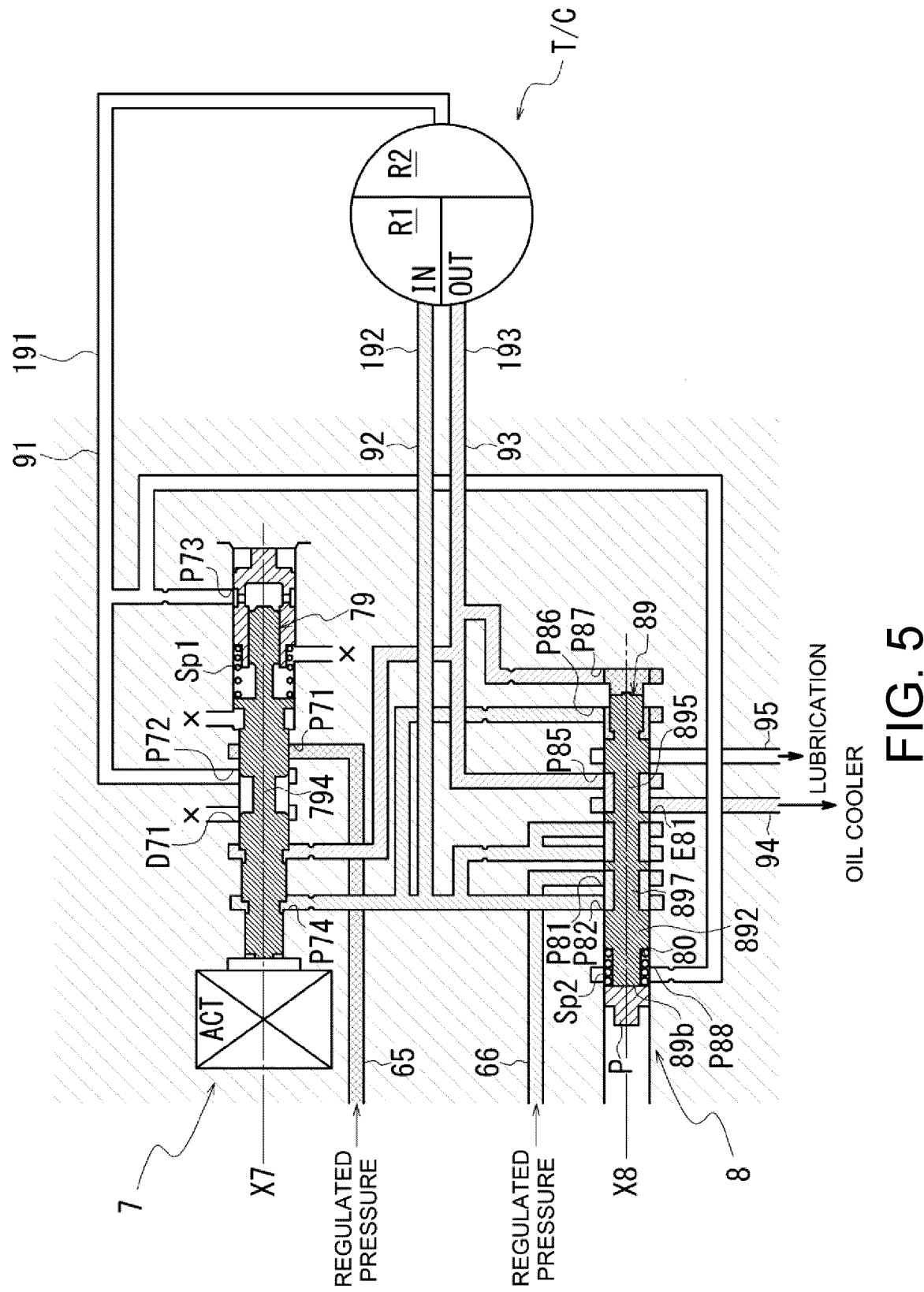
FIG. 5 is a diagram illustrating a flow of oil in the hydraulic circuit when the lock-up control valve is disposed at a second valve position.

FIG. 5 is a diagram illustrating a flow of oil in the hydraulic circuit 6 when the valve body 79 of the lock-up control valve 7 is disposed at a second valve position. In FIG. 5, the valve body 89 of the torque converter control valve 8 is disposed at a fourth valve position.

As illustrated in FIG. 3, in the lock-up control valve 7, the valve body 79 is accommodated in a cylindrical sleeve 70. The valve body 79 is provided to be movable in a center line direction (direction of axis X7) along a longitudinal direction of the sleeve 70.

One end of the sleeve 70 in the longitudinal direction is sealed by a wall portion 701, and the other end thereof is sealed by an actuator ACT fitted inside the sleeve 70.

On an inner periphery of the sleeve 70, a fourth port P74, a fifth port P75, a drain port D71, a second port P72, a first port P71, a drain port D72, a drain port D73, and a third port P73 are opened in this order from an actuator ACT side.

The oil passage 65 is connected to the first port P71. The oil OL of which the pressure is regulated by the second pressure regulating valve 62 described above is supplied to the first port P71 via the oil passage 65.

A first oil passage 91 that communicates with the oil chamber R2 (see FIG. 4) of the torque converter T/C is connected to the second port P72. A branch path 911 is connected to the middle of the first oil passage 91.

The branch path 911 is connected to the third port P73. The branch path 911 is connected to a branch path 912 and is provided with a narrowed portion C (flow rate regulating portion) for flow rate regulation. The narrowed portion C of the branch path 911 is a portion having a cross-sectional area smaller than a cross-sectional area of an oil passage of the branch path 911. The narrowed portion C is provided between the third port P73 and a connection portion with the branch path 912. The narrowed portion C is provided to regulate a discharge rate of the oil OL in the sleeve 70 via the third port P73 and a supply rate of the oil OL into the sleeve 70 via the third port P73.

The branch path 912 communicates with an eighth port P88 of the torque converter control valve 8. In the branch path 912, a narrowed portion C (flow rate regulating portion) for flow rate regulation is provided in the vicinity of the eighth port P88. The narrowed portion C is provided to regulate a discharge rate of the oil OL in the sleeve 80 via the eighth port P88 and a supply rate of the oil OL into the sleeve 80 via the eighth port P88.

Here, the terms "regulation of the discharge rate of the oil OL" and "regulation of the supply rate of the oil OL" mean that the flow rate of the oil OL is regulated such that the oil OL in the sleeves 70 and 80 is not suddenly discharged and the oil OL is not suddenly supplied into the sleeves 70 and 80.

A branch path 921 is connected to the fourth port P74 of the lock-up control valve 7. The branch path 921 is an oil passage branched from a second oil passage 92. The second oil passage 92 is an oil passage that connects the torque converter control valve 8 and the input port IN of the torque converter T/C (see FIG. 4).

Thus, part of the oil OL supplied from the torque converter control valve 8 to the torque converter T/C flows into the sleeve 70 from the fourth port P74. In the branch path 921, a narrowed portion C for flow rate regulation is provided in the vicinity of the fourth port P74. The narrowed portion C is provided to regulate a discharge rate of the oil OL in the sleeve 70 via the fourth port P74 and a supply rate of the oil OL into the sleeve 70 via the fourth port P74.

A branch path 931 is connected to the fifth port P75. The branch path 931 is an oil passage branched from a third oil passage 93. The third oil passage 93 is an oil passage that connects the torque converter control valve 8 and the output port OUT of the torque converter T/C (see FIG. 4).

Thus, part of the oil OL returned from the torque converter T/C to the torque converter control valve 8 flows into the sleeve 70 from the fifth port P75. In the branch path 931, a narrowed portion C for flow rate regulation is provided in the vicinity of the fifth port P75. The narrowed portion C is provided to regulate a discharge rate of the oil OL in the sleeve 70 via the fifth port P75 and a supply rate of the oil OL into the sleeve 70 via the fifth port P75.

Thus, part of the oil OL flowing through the second oil passage 92 and part of the oil OL flowing through the third oil passage 93 flow into the sleeve 70 via the fourth port P74 and the fifth port P75, respectively.

The oil flowing into the sleeve 70 via the fourth port P74 and the fifth port P75 apply, to the valve body 79, an urging force (operation force) that causes the valve body 79 to move to a first valve position side (right side in the drawing).

A support member 78 of a spring Sp1 is inserted into the sleeve 70. The support member 78 is positioned at a position where one end 78a thereof in the longitudinal direction is in contact with the wall portion 701.

A cylindrical insertion hole 781 is provided inside the support member 78. The insertion hole 781 is opened at the other end 78b of the support member 78.

A shaft portion 790 on a one end 79a side of the valve body 79 is inserted into the insertion hole 781. The shaft portion 790 of the valve body 79 is provided to be movable in the direction of the axis X7 in the insertion hole 781.

In the support member 78, a communication hole 782 is opened in an outer periphery on a one end 78a side. The communication hole 782 allows the insertion hole 781 and the third port P73 to communicate with each other.

Therefore, part of the oil OL flowing through the first oil passage 91 flows into the insertion hole 781 from the third port P73. The oil OL flowing into the insertion hole 781 applies, to the valve body 79, an urging force (operation force) that causes the valve body 79 to move to the actuator ACT side (left side in the drawing).

One end side of the spring Sp1 is externally inserted into and positioned at a small-diameter portion 783 on an other end 78b side of the support member 78. The other end of the spring Sp1 is in contact with a large-diameter portion 791 of the valve body 79 in the direction of the axis X7. The valve body 79 is urged to the actuator ACT side (left side in the drawing) by an urging force applied from the spring Sp1.

In the valve body 79, a small-diameter portion 794 is provided between a land 792 and a land 793 on an other end 79b side viewed from a large-diameter portion 791. Further, on the actuator ACT side of the land 793, a second land 795 having a diameter smaller than that of the land 793 and a third land 796 having a diameter smaller than that of the second land 795 are provided in the direction of the axis X7 at an interval.

An operator NB of the actuator ACT is in contact with the other end 79b of the valve body 79 in the direction of the axis X7. The operator NB of the actuator ACT can be projected and retracted in the direction of the axis X7 by a solenoid (not illustrated). When the operator NB protrudes from the actuator ACT, an operation force that presses the valve body 79 to one side (right side in the drawing) in the direction of the axis X7 is applied to the valve body 79.

When the operation force applied to the valve body 79 becomes larger than the urging force of the spring Sp1, the valve body 79 compresses the spring Sp1 in the direction of the axis X7 and causes the one end 79a of the valve body 79 to displace to the first valve position (lock-up position) where the one end 79a is in contact with a bottom wall 781a of the support member 78.

When the valve body 79 is disposed at the first valve position, the small-diameter portion 794 is disposed at a position allowing the first port P71 and the second port P72 to communicate with each other.

Thus, as illustrated in FIG. 4, the oil OL supplied to the first port P71 is supplied to the oil chamber R2 via the first oil passage 91 connected to the second port P72.

When input of the operation force from the actuator ACT to the valve body 79 is completed, the valve body 79 displaces to the actuator ACT side (left side in the drawing) by the urging force applied from the spring Sp1. Thus, the valve body 79 displaces to the second valve position (non-lock up position: see FIG. 5) where the operator NB is accommodated in the actuator ACT.

When the valve body 79 is disposed at the second valve position, the small-diameter portion 794 of the valve body 79 is disposed at a position where the second port P72 and the drain port D71 communicate with each other.

Thus, as illustrated in FIG. 5, the oil in the first oil passage 91 is discharged through the second port P72 and the drain port D71. Accordingly, supply of the oil OL to the oil chamber R2 is shut off.

In this manner, in the lock-up control valve 7, the valve body 79 displaces between the first valve position and the second valve position, thereby switching supply and shutoff of the oil OL into the oil chamber R2.

As described above, in the torque converter T/C, the state of the lock-up device 2 (see FIG. 1) is switched between the engaged state and the released state by causing the piston 43 (see FIG. 1) to displace using the differential pressure between the oil chamber R1 and the oil chamber R2.

Here, it is necessary to regulate an amount of the oil OL supplied to the oil chamber R1 in conjunction with the supply and shutoff of the oil OL into the oil chamber R2. The amount of the oil OL supplied to the oil chamber R1 is controlled by the torque converter control valve 8.

In the present embodiment, the hydraulic pressure supplied from the lock-up control valve 7 to the oil chamber R2 is used as a control pressure of the torque converter control valve 8.

As illustrated in FIG. 3, in the torque converter control valve 8, the valve body 89 is accommodated in the cylindrical sleeve 80. The valve body 89 is provided to be movable in a center line direction (direction of axis X8) along a longitudinal direction of the sleeve 80.

One end of the sleeve 80 in the longitudinal direction is sealed by a wall portion 801. The other end of the sleeve 80 is sealed by a plug P fitted inside the sleeve 80.

In an inner periphery of the sleeve 80, the eighth port P88, a second port P82, a first port P81, a third port P83, a fourth port P84, a discharge port E81, a fifth port P85, a discharge port E82, a sixth port P86, and a seventh port P87 are opened in this order from a plug P side.

The oil passage 66 is connected to the first port P81. The oil OL from the first pressure regulating valve 61 is supplied to the first port P81 via the oil passage 66.

The second oil passage 92 that communicates with the input port IN of the torque converter T/C is connected to the second port P82. The branch path 921 that communicates with the fourth port P74 of the lock-up control valve 7 described above is connected to the middle of the second oil passage 92.

In the branch path 921, a branch path 922 is connected between the narrowed portion C and the second oil passage 92. The branch path 922 is connected to the sixth port P86 of the torque converter control valve 8.

In the second oil passage 92, a connection path 923 is provided between the second port P82 and the branch path 921. The connection path 923 connects the second oil passage 92 and the third port P83.

The connection path 923 is provided with a narrowed portion C for flow rate regulation. A branch path 924 is connected between the third port P83 and the narrowed portion C. The branch path 924 is connected to the fourth port P84.

A fourth oil passage 94 that communicates with the oil cooler is connected to the discharge port E81.

A fifth oil passage 95 through which the oil OL for lubrication flows is connected to the discharge port E82.

The third oil passage 93 that communicates with the output port of the torque converter T/C is connected to the fifth port P85. The branch path 931 and a branch path 932 are connected in the middle of the third oil passage 93. The branch path 931 is connected to the fifth port P75 of the lock-up control valve 7 described above. The branch path 932 is connected to the seventh port P87 of the torque converter control valve 8. The branch path 932 is provided with a narrowed portion C for flow rate regulation. The narrowed portion C is provided to regulate a discharge rate of the oil OL in the sleeve 80 from the seventh port P87 and a supply rate of the oil OL supplied to the branch path 932 into the sleeve 80 from the seventh port P87.

A narrowed portion C for flow rate regulation is also provided in the branch path 922 extending from the sixth port P86 adjacent to the seventh port P87. The narrowed portion C is provided to regulate a discharge rate of the oil OL in the sleeve 80 via the sixth port P86 and a supply rate of the oil OL into the sleeve 80 via the sixth port P86.

Thus, part of the oil OL flowing through the second oil passage 92 and part of the oil OL flowing through the third oil passage 93 flow into the sleeve 80 via the sixth port P86 and the seventh port P87, respectively.

The oil OL flowing into the sleeve 80 via the sixth port P86 and the seventh port P87 applies, to the valve body 79, an urging force (operation force) that causes the valve body 89 to move to the plug P side (left side in the drawing).

While the oil pump OP is stopped, the oil OL is not supplied from the oil pump OP to the torque converter control valve 8. Therefore, while the oil pump OP is stopped, the oil OL does not flow through the inside of the second oil passage 92 and the third oil passage 93, and thus the urging force (operation force) that causes the valve body 89 to move to the plug P side (left side in the drawing) is not applied to the valve body 79.

As described above, the torque converter control valve 8 uses the oil OL (hydraulic pressure) output by the lock-up control valve 7 for displacement of the valve body 89 in order to cause the valve body 89 to displace in conjunction with the supply and shutoff of the oil OL into the oil chamber R2.

The branch path 912 branched from the first oil passage 91 of the lock-up control valve 7 is connected to the eighth port P88 located on the plug P side in the sleeve 80.

The oil OL (lock-up control pressure) supplied from a lock-up control valve 7 side via the branch path 912 flows into the sleeve 80 via the eighth port P88. The oil OL flowing into the sleeve 80 applies, to the valve body 89, an urging force (operation force) that causes the valve body 89 to move to a wall portion 801 side (right side in the drawing).

The valve body 89 has large-diameter portions 891 and 892 on a one end 89a side and an other end 89b side in the longitudinal direction. The large-diameter portions 891 and 892 are formed to have an outer diameter matching an inner diameter of the sleeve 80.

Wall portions 893 and 894 are located between the large-diameter portion 891 and the large-diameter portion 892 in the direction of the axis X8. Between the large-diameter portion 891 and the wall portion 893, between the wall portion 893 and the wall portion 894, and between the wall portion 894 and the large-diameter portion 892 are small-diameter portions 895, 896, and 897 into which the oil OL can flow, respectively.

The valve body 89 can be provided within a range between a position (third valve position: see FIG. 4) where the one end 89a in the longitudinal direction is in contact with the wall portion 801 and a position (fourth valve position: see FIG. 5) where the other end 89b in the longitudinal direction is in contact with the plug P.

One end of a spring Sp2 is in contact with the large-diameter portion 892 of the valve body 89 in the direction of the axis X8, and the other end of the spring Sp2 is in contact with the plug P. The spring Sp2 applies, to the valve body 89, an urging force in a direction in which the valve body 89 is caused to move toward the wall portion 801 side.

Hereinafter, displacement of the valve body 89 of the torque converter control valve 8 when the stopped oil pump OP is operated will be described.

While the oil pump OP is stopped, the supply of the oil OL to the first port P81 via the oil passage 66 is shut off. Therefore, the oil OL is not supplied into the sleeve 80 via the sixth port P86 and the seventh port P87. Further, the oil OL is not supplied to the eighth port P88 via the branch path 912.

Therefore, the valve body 89 is held at the third valve position where the one end 89a is in contact with the wall portion 801 by only the urging force of the spring Sp2.

That is, while the oil pump OP is stopped, the valve body 89 is held at the third valve position only by the urging force of the spring Sp2.

When the oil pump OP is operated, the supply of the oil OL to the first port P81 via the oil passage 66 is started. Here, the valve body 89 disposed at the third valve position allows the first port P81 and the third port P83 to communicate with each other. Therefore, the oil OL supplied to the first port P81 flows into the connection path 923 through the third port P83.

Here, in the connection path 923, the narrowed portion C is present between a connection portion with the second oil passage 92 and a connection portion with the branch path 924. Therefore, most of the oil OL flowing into the connection path 923 from the third port P83 flows into a branch path 924 side, and part of the oil OL flows into the second oil passage 92 through the narrowed portion C.

Part of the oil OL flowing into the second oil passage 92 is supplied to the sixth port P86 through the branch path 922 branched from the second oil passage 92. Further, the remaining oil OL flows into the third oil passage 93 via the oil chamber R1 of the torque converter T/C connected to the second oil passage 92. Part of the oil OL flowing into the third oil passage 93 is supplied to the seventh port P87 through the branch path 932 branched from the third oil passage 93.

The oil OL supplied to the sixth port P86 and the seventh port P87 flows into the sleeve 80 and is applied to the large-diameter portion 891 of the valve body 89. An urging force in a direction in which the valve body 89 is caused to move to a fourth valve position side (left side in the drawing) is applied to the large-diameter portion 891 from the oil OL flowing in.

A pressure of the oil OL output by the oil pump OP is low immediately after the oil pump OP is driven, but rises in a short time. Therefore, the urging force applied from the oil OL flowing in from the sixth port P86 and the seventh port P87 increases in a short time from the start of operation of the oil pump OP. As a result, the valve body 89 displaces to the fourth valve position side (left side in the drawing) against the urging force of the spring Sp2.

Accordingly, the valve body 89 is finally held at the fourth valve position where the other end 89b is in contact with the plug P. While the valve body 89 is held at the fourth valve position, the first port P81 and the second oil passage 92 communicate with each other, and the third oil passage 93 and the discharge port E81 communicate with each other (see FIG. 5).

Accordingly, a flow of the oil OL that is discharged from the oil passage 66 to the fourth oil passage 94 (discharge passage) through the second oil passage 92, the oil chamber R1, and the third oil passage 93 is formed. In this state, the torque converter T/C is in the converter state, and in the torque converter T/C, the rotational driving force input from the driving source is transmitted to the input shaft 16 via the oil OL in the oil chamber R1.

That is, when the oil pump OP is driven from a stopped state, the valve body 89 of the torque converter control valve 8 displaces from the third valve position to the fourth valve position, and the torque converter T/C enters the converter state.

Hereinafter, operations of the lock-up control valve 7 and the torque converter control valve 8 when the torque converter T/C is switched from the converter state to the lock-up state will be described.

When the lock-up device 2 is brought into the lock-up state, the actuator ACT of the lock-up control valve 7 disposes the valve body 79 at the first valve position (see FIG. 4).

Accordingly, the oil OL supplied to the first port P71 is supplied to the oil chamber R2 via the first oil passage 91 connected to the second port P72, and as a result, a pressure of the oil OL in the oil chamber R2 increases.

In this case, part of the oil OL flowing through the first oil passage 91 flows into the third port P73 of the lock-up control valve 7. The oil OL flowing in via the third port P73 applies, to the valve body 79, an urging force that causes the valve body 79 to displace to the second valve position side (left side in the drawing).

A direction of the urging force applied from the oil OL is opposite to a direction of the operation force applied from the actuator ACT, and is a direction of narrowing an opening area of the first port P71.

Here, a pressure of the oil in the first oil passage 91 changes according to the opening area of the first port P71. A pressure of the oil OL flowing into the third port P73 changes according to the pressure of the oil in the first oil passage 91.

The opening area of the first port P71 increases as the valve body 79 displaces toward the first valve position. Since the pressure of the oil OL in the third port P73 is also small immediately after the valve body 79 starts to displace toward the first valve position, movement of the valve body 79 in a direction of increasing the opening area of the first port P71 is prioritized.

Accordingly, the supply of the oil OL to the first oil passage 91 is prioritized, and the pressure in the oil chamber R2 rapidly increases.

When the pressure of the oil OL in the oil chamber R2 increases, the pressure of the oil OL flowing in from the third port 73 also increases, and the urging force applied to the valve body 79 from the oil OL flowing in from the third port 73 also increases.

Here, the piston 43 of the lock-up device 2 is driven using the differential pressure between the oil chamber R2 and the oil chamber R1. Therefore, the operation force applied to the valve body 79 from the oil OL flowing in from the third port 73 reflects the differential pressure between the oil chamber R2 and the oil chamber R1.

After the pressure in the oil chamber R2 is ensured, an urging force corresponding to the pressure of the oil in the oil chamber R2 causes the valve body 79 to displace in a direction of narrowing an opening of the first port P71.

Accordingly, in the valve body 79, the operation force applied from the actuator ACT that causes the valve body 79 to displace to one side and the urging force (operation force) applied from the oil OL that causes the valve body 79 to displace to the other side are balanced, and the pressure of the oil OL in the oil chamber R2 is stabilized.

Further, the pressure of the oil OL in the oil chamber R2 can be finely regulated as compared with a case where only the urging force applied from the spring Sp1 is applied to the valve body 79. Accordingly, the pressure of the oil OL in the oil chamber R2 can be accurately controlled, and thus the controllability of the lock-up device 2 is improved.

Here, in the lock-up control valve 7, a narrowed portion C is provided in each of the vicinity of the third port P73 in the branch path 911, the vicinity of the fourth port P74 in the branch path 921, and the vicinity of the fifth port P75 in the branch path 931. The narrowed portion C is provided to control an inflow rate of the oil OL into the sleeve 70 and a discharge rate of the oil OL from the sleeve 70.

When a supply or discharge rate of the oil OL to or from the sleeve 70 is too fast, a sudden displacement of the valve body 79 may occur. In such a case, there is a possibility that the controllability of the lock-up device is reduced due to a sudden change in the hydraulic pressure (lock-up control pressure) output by the lock-up control valve 7.

As described above, by providing the narrowed portion C and controlling the supply or discharge rate of the oil OL to or from the sleeve 70 to a rate at which the sudden displacement of the valve body 79 can be avoided, the sudden change in the lock-up control pressure is avoided, thereby improving the controllability of the lock-up device.

In the present embodiment, the valve body 89 of the torque converter control valve 8 is caused to displace using the oil OL supplied to the first oil passage 91.

When the valve body 79 of the lock-up control valve 7 is disposed at the first valve position and the oil OL is supplied to the first oil passage 91, part of the oil OL (lock-up control pressure) flowing through the first oil passage 91 flows into the sleeve 80 of the torque converter control valve 8 from the eighth port P88.

The oil OL flowing in from the eighth port P88 is applied to the large-diameter portion 892 of the valve body 89 from the plug P side. Thus, as illustrated in FIG. 4, the valve body 89 moves in a direction away from the plug P and is disposed at a position (third valve position) where the one end 89a is in contact with the wall portion 801.

When the valve body 89 is disposed at the third valve position, the first port P81 and the third port P83 communicate with each other via the small-diameter portion 897 of the valve body 89, and the fourth port P84 and the discharge port E81 communicate with each other via the small-diameter portion 896 of the valve body 89.

Accordingly, as illustrated in FIG. 4, the oil OL supplied to the first port P81 flows into the connection path 923 from the third port P83 through the small-diameter portion 897. Since the narrowed portion C is provided in the connection path 923, most of the oil OL flowing into the connection path 923 flows into the branch path 924 rather than into the second oil passage 92. Accordingly, the oil OL flowing into the branch path 924 is discharged to the fourth oil passage 94 through the fourth port P84, the small-diameter portion 896, and the discharge port E81.

Thus, most of the oil OL supplied to the first port P81 is supplied to the oil cooler (not illustrated).

Part of the oil OL flowing into the connection path 923 flows into the second oil passage 92 through the narrowed portion C. Therefore, a necessary amount of oil OL flows into the oil chamber R1 of the torque converter T/C even while the clutch mechanism 4 is in the lock-up state.

The oil OL discharged from the oil chamber R1 is supplied to the fifth port P85 via the third oil passage 93.

Here, when the valve body 89 is located at the third valve position, the fifth port P85 and the discharge port E82 communicate with each other via the small-diameter portion 895. Thus, the oil OL flowing into the fifth port P85 is discharged from the discharge port E82 to the fifth oil passage 95. Since the fifth oil passage 95 is a flow path of oil used to lubricate a rotating body such as a bearing, the oil OL discharged to the fifth oil passage 95 is finally used to lubricate the bearing or the like.

When the lock-up device 2 is brought into the released state, the input of the operation force from the actuator ACT to the valve body 79 is completed in the lock-up control valve 7. Thus, the valve body 79 is disposed at the second valve position by the urging force of the spring Sp1 (see FIG. 5).

When the valve body 79 is disposed at the second valve position, the small-diameter portion 794 of the valve body 79 is disposed at a position where the second port P72 and the drain port D71 communicate with each other.

Thus, as illustrated in FIG. 5, the oil in the first oil passage 91 is discharged through the second port P72 and the drain port D71. Accordingly, the supply of the oil OL to the oil chamber R2 is shut off, and the pressure of the oil OL in the oil chamber R2 is reduced.

When the supply of the oil OL into the oil chamber R2 is shut off, the supply of the oil OL to the eighth port P88 of the torque converter control valve 8 is stopped.

Here, in the torque converter control valve 8, while the torque converter T/C is in the lock-up state (the lock-up device 2 is in the engaged state), the valve body 89 is held at the third valve position by the urging forces of the oil OL flowing into the sleeve 80 from the eighth port P88 and the spring Sp2.

As described above, even while the valve body 89 is disposed at the third valve position, part of the oil OL flowing into the connection path 923 from the third port P83 flows into the second oil passage 92. Therefore, the oil OL is supplied into the sleeve 80 via the sixth port P86 and the seventh port P87, and the urging force in the direction in which the valve body 89 is caused to move to the fourth valve position side (left side in the drawing) is applied to the valve body 89 from the oil OL flowing in.

In the present embodiment, the urging force of the oil OL flowing into the sleeve 80 via the sixth port P86 and the seventh port P87 is set to be larger than the urging force of the spring Sp2. Therefore, when the supply of the oil OL into the sleeve 80 via the eighth port P88 is stopped, the valve body 89 enters a state of being urged toward the third valve position only by the urging force of the spring Sp2.

Thus, the valve body 89 displaces to the plug P side by the urging force of the oil OL flowing into the sleeve 80 via the sixth port P86 and the seventh port P87. Finally, the valve body 89 is disposed at a position (fourth valve position) where the other end 89b is in contact with the plug P (see FIG. 5)

When the valve body 89 is disposed at the fourth valve position, the small-diameter portion 897 of the valve body 89 allows the first port P81 and the second port P82 to communicate with each other, and the small-diameter portion 895 of the valve body 89 is disposed at a position allowing the fifth port P85 and the discharge port E81 to communicate with each other.

Thus, the oil passage 66 is connected to the second oil passage 92 via the first port P81, the small-diameter portion 897, and the second port P82. Accordingly, all of the oil OL supplied via the oil passage 66 is supplied to the oil chamber R1.

Further, the third oil passage 93 is connected to the fourth oil passage 94 via the fifth port P85 and the discharge port E81. Accordingly, the oil OL returned from the torque converter T/C is supplied to the oil cooler with which the fourth oil passage 94 communicates.

As described above, in the hydraulic circuit 6 according to the embodiment, the valve body 89 of the torque converter control valve 8 is driven using the oil OL (hydraulic pressure) supplied from the lock-up control valve 7 to the oil chamber R2.

That is, the valve body 89 of the torque converter control valve 8 displaces in conjunction with the displacement of the valve body 79 of the lock-up control valve 7 driven by the actuator ACT.

Thus, the torque converter control valve 8 switches the supply path of the oil OL supplied via the oil passage 66 between the following two paths in conjunction with the switching between supply and shutoff of the oil OL (lock-up control pressure) from the lock-up control valve 7 to the oil chamber R2.

(a) A path in which most of the oil OL supplied via the oil passage 66 is supplied to an oil cooler side without passing through the oil chamber R1 of the torque converter T/C (see FIG. 4).

(b) A path in which the oil OL supplied via the oil passage 66 is supplied to the oil cooler side after passing through the oil chamber R1 of the torque converter T/C (see FIG. 5).

Figure 6:
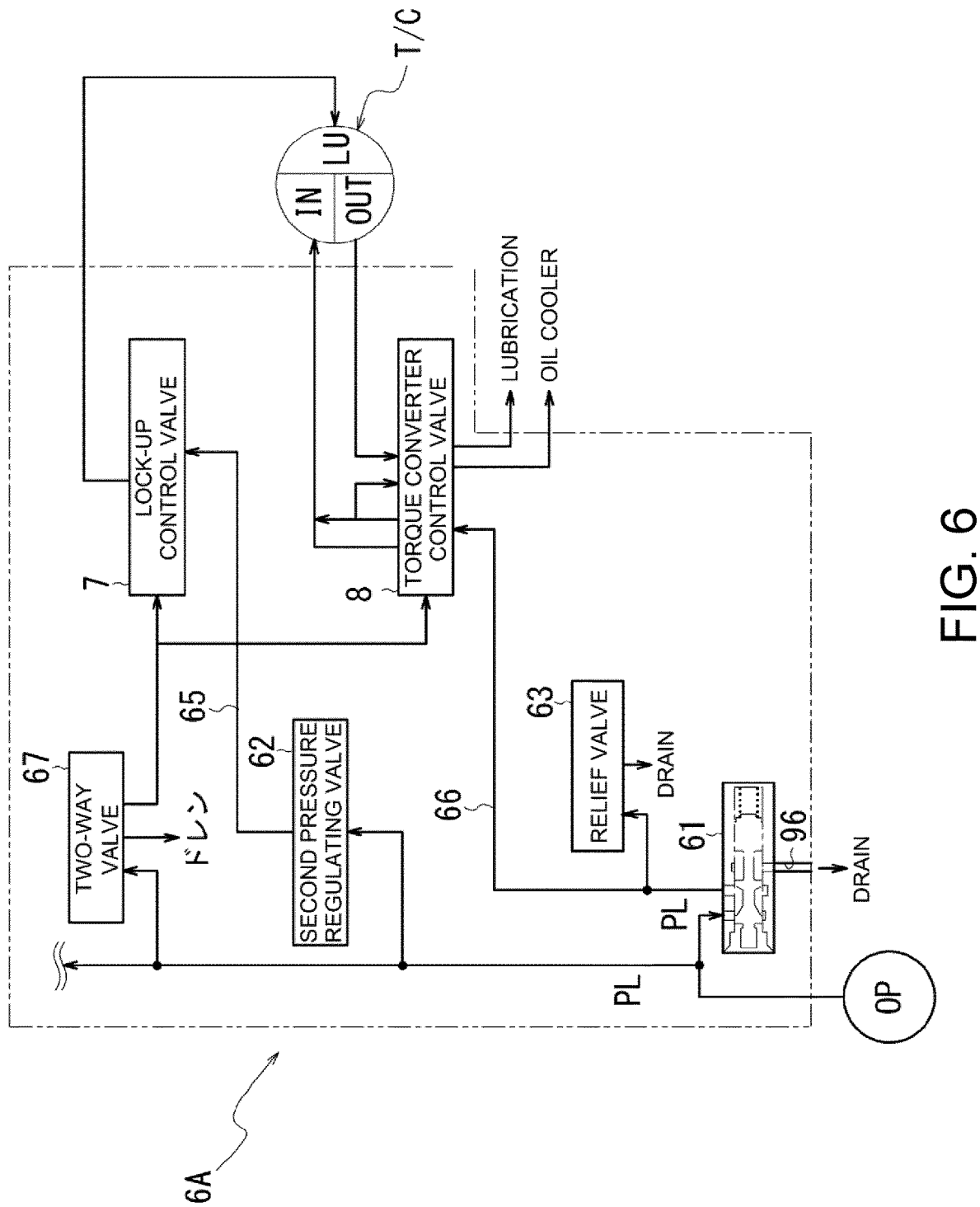
FIG. 6 is a diagram illustrating the hydraulic circuit in a case where control of the lock-up control valve is executed by a two-way valve.

FIG. 6 is a diagram illustrating a hydraulic circuit in a case where the control of the lock-up control valve 7 and the torque converter control valve 8 is executed by a two-way valve as a comparative example.

In the hydraulic circuit illustrated in FIG. 6, the control pressure regulated by a two-way valve 67 is used to drive the valve body of the lock-up control valve 7 and the valve body of the torque converter control valve 8.

In a case of a specification in which the valve body is caused to displace by using the control pressure regulated by the two-way valve 67, the following problems are to be solved.

(a) Since the two-way valve 67 generates a supply pressure from the line pressure PL by regulating the drain amount, it is necessary to ensure an amount of oil supplied to the two-way valve.

In the case of the present application, the valve body 79 of the lock-up control valve 7 is driven by the actuator ACT instead of being driven by the supply pressure regulated by the two-way valve. Further, the oil OL (lock-up control pressure) output by driving the valve body 79 is used to drive the valve body 89 of the torque converter control valve 8.

Thus, substantially, both the lock-up control valve 7 and the torque converter control valve 8 are controlled by a single actuator ACT.

Therefore, it is unnecessary to ensure the amount of the oil OL for the lock-up control valve 7 and the torque converter control valve 8, unlike a case where the two-way valve is used.

That is, the amount of the oil OL necessary for driving the lock-up control valve 7 and the torque converter control valve 8 can be reduced as compared with the case where the two-way valve is used, and thus a load of the oil pump OP can be reduced.

Thus, in a case where the hydraulic circuit 6 is a hydraulic circuit of a transmission for a vehicle and the oil pump OP is driven by the rotational driving force of the driving source, a load on the driving source of the vehicle equipped with the transmission can be reduced. Accordingly, improvement in fuel efficiency of the vehicle can be expected. In addition, in a case where the oil pump is an electric oil pump, improvement in power consumption (electric power efficiency) in the vehicle equipped with the transmission can be expected.

As described above, the hydraulic circuit 6 according to an aspect of the present invention has the following configuration.

(1) The hydraulic circuit 6 includes the first pressure regulating valve 61 (regulator valve) that regulates the line pressure PL based on the hydraulic pressure supplied from the oil pump OP (hydraulic pressure source), the torque converter control valve 8 that controls the oil OL supplied to the torque converter T/C, and the lock-up control valve 7 that controls the oil OL supplied to the oil chamber R2 (piston oil chamber) of the torque converter.

The lock-up control valve 7 includes the valve body 79 that is displaceable in the direction of the axis X7 (axial direction) in the sleeve 70, the actuator ACT that applies an operation force that causes the valve body 79 to displace toward the first valve position on one side in the direction of the axis X7 to the valve body 79 from the other side in the direction of the axis X7, the spring Sp1 (urging member) that applies an urging force that causes the valve body 79 to displace to the second valve position on the other side in the direction of the axis X7 to the valve body 79 from the one side in the direction of the axis X7, the first port P71 to which the oil OL having the line pressure PL as a source pressure is supplied, the second port P72 that communicates with the first oil passage 91 connected to the oil chamber R2, the third port P73 that communicates with the first oil passage 91, and the drain port D71.

The valve body 79 is displaceable between the first valve position and the second valve position, the first valve position allowing the first port P71 and the second port P72 to communicate with each other, the second valve position allowing the second port P72 and the drain port D71 to communicate with each other, and the oil flowing in from the third port P73 urges the valve body 79 toward the second valve position.

That is, the valve body 79 has the lands 792 and 793 on both sides in the direction of the axis X7 with the small-diameter portion 794 interposed therebetween, and has the shaft portion 790 at the one end 79a in the direction of the axis X7.

When the valve body 79 is disposed at the first valve position, the small-diameter portion 794 is disposed at the position allowing the first port P71 and the second port P72 to communicate with each other, and the urging force in a direction in which the valve body 79 is caused to displace toward the second valve position is applied to the shaft portion 790 from the oil OL flowing in from the third port P73.

Further, when the valve body 79 is disposed at the second valve position, the small-diameter portion 794 is disposed at the position allowing the second port P72 and the drain port D71 to communicate with each other.

With such a configuration, when the operation force applied to the valve body 79 from the actuator ACT becomes larger than the urging force applied to the valve body 79 from the spring Sp1 (urging member), the valve body 79 displaces toward the first valve position on the one side in the axial direction. When the valve body 79 approaches the first valve position, the first port P71 and the second port P72 communicate with each other. At a timing when the valve body 79 reaches the first valve position, the opening area of the first port P71 is maximized.

By the displacement of the valve body 79 toward the first valve position, the hydraulic pressure (lock-up control pressure) for bringing the lock-up device 2 into the engaged state is supplied to the oil chamber R2 (piston oil chamber) via the first oil passage 91.

In this case, the hydraulic pressure flowing in via the third port P73 applies, to the valve body 79, an urging force that causes the valve body 79 to displace toward the second valve position. Here, the displacement of the valve body 79 toward the second valve position is a displacement in a direction of reducing the opening area of the first port P71.

In a case where only the urging force applied from the spring Sp1 urges the valve body 79 toward the second valve position, the opening area of the first port P71 is uniformly determined by a magnitude relation between the operation force of the actuator ACT and the urging force of the spring Sp1.

Since the hydraulic pressure flowing in via the third port P73 causes an urging force reflecting the pressure in the oil chamber R2 to be applied to the valve body 79, in a case where the pressure in the oil chamber R2 is high, a large urging force is applied to the valve body 79, and in a case where the pressure in the oil chamber R2 is low, a small urging force is applied to the valve body 79.

Thus, the hydraulic pressure (lock-up control pressure) can be finely regulated as compared with the case where only the urging force applied from the spring Sp1 is applied to the valve body 79. Accordingly, the lock-up control pressure can be accurately controlled, and the controllability of the lock-up clutch is improved.

In a case of a specification in which instead of the actuator ACT, a supplied pressure regulated by the two-way valve is applied to the valve body to cause the valve body to displace to one side in the axial direction, the following problem is to be solved.

Since the two-way valve generates a supply pressure from a line pressure by regulating a drain amount, it is necessary to ensure an amount of oil supplied to the two-way valve.

In the case of the present application, the valve body 79 is driven by the actuator ACT instead of being driven by the supply pressure regulated by the two-way valve. Accordingly, it is unnecessary to ensure the amount of the oil OL, unlike the case where a two-way valve is used. That is, the amount of oil necessary for driving the lock-up control valve 7 can be reduced, and thus the load of the oil pump OP can be reduced. Thus, in a case where the hydraulic circuit is a hydraulic circuit of a transmission for a vehicle and the oil pump OP is driven by the rotational driving force of the driving source, the load on the driving source of the vehicle equipped with the transmission can be reduced. Accordingly, the improvement in fuel efficiency of the vehicle can be expected. In addition, in the case where the oil pump is an electric oil pump, the improvement in power consumption (electric power efficiency) in the vehicle equipped with the transmission can be expected.

(2) The hydraulic circuit 6 includes
the second oil passage 92 through which the oil OL supplied from the torque converter control valve 8 to the torque converter T/C flows, and
the third oil passage 93 through which the oil OL discharged from the torque converter T/C flows.
The lock-up control valve 7 includes
the fourth port P74 that communicates with the second oil passage 92, and
the fifth port P75 that communicates with the third oil passage 93.
The oil OL flowing in from the fourth port P74 and the oil OL flowing in from the fifth port P75 apply, to the valve body 79, an urging force that causes the valve body 79 to displace toward the first valve position.

That is, the valve body 79 has the second land 795 on the other end 79b side of the land 793. The oil OL flowing in from the fourth port P74 applies, to the second land 795, an urging force in a direction in which the valve body 79 is caused to displace toward the first valve position. The oil OL flowing in from the fifth port P75 applies, to the land 793, an urging force in the direction in which the valve body 79 is caused to displace toward the first valve position.

The lock-up device 2 is switched between the engaged state and the released state using a differential pressure between a hydraulic pressure supplied to the oil chamber R2 (piston oil chamber) and a pressure in the oil chamber R1 of the torque converter T/C.

With such a configuration described above, the pressure of the oil OL supplied to the torque converter T/C and the pressure of the oil OL discharged from the torque converter T/C apply, to the valve body 79, urging forces that cause the valve body 79 to displace toward the first valve position.

Thus, for example, when the pressure in the oil chamber R1 of the torque converter T/C is high, an amount of displacement of the valve body 79 toward the first valve position increases, and as a result, the opening area of the first port P71 increases. Thus, an amount of the oil OL supplied to the first oil passage 91 increases, and as a result, the pressure of the oil OL in the oil chamber R2 increases. Accordingly, even when the pressure in the torque converter T/C is high, the lock-up device 2 can be brought into the engaged state.

That is, the pressure of the oil OL in the oil chamber R2 is regulated according to the pressure of the oil OL in the oil chamber R1 of the torque converter T/C. Accordingly, an engagement timing of the lock-up device 2 can be controlled according to the pressure of the oil OL in the oil chamber R1 of the torque converter T/C.

When the hydraulic pressure supplied to the torque converter T/C or the hydraulic pressure discharged from the torque converter T/C increases, the opening area of the first port P71 increases, and the amount of oil supplied to the oil chamber R2 (lock-up oil chamber) increases. In a case where the pressure of the oil OL in the oil chamber R2 is not regulated according to the pressure of the oil OL in the torque converter T/C, the lock-up device 2 is controlled with a small amount of oil. With such a configuration described above, the controllability of the lock-up clutch can be improved as compared with the case where the pressure of the oil OL in the oil chamber R2 is not regulated according to the pressure of the oil OL in the torque converter T/C.

(3) In the lock-up control valve 7,
the narrowed portion C (oil flow rate regulating portion) is provided in each of the branch path 911 (connection path) connecting the first oil passage 91 and the third port P73, the branch path 921 (connection path) connecting the second oil passage 92 and the fourth port P74, and the branch path 931 (connection path) connecting the third oil passage 93 and the fifth port P75.

The narrowed portion C regulates a flow rate of the oil OL such that the oil OL in the sleeve 70 is not suddenly discharged and the oil OL is not suddenly supplied into the sleeve 70.

When a supply or discharge rate of the oil OL to or from the sleeve 70 is too fast, a sudden displacement of the valve body 79 may occur. In such a case, there is a possibility that the controllability of the lock-up device is reduced due to a sudden change in the hydraulic pressure (lock-up control pressure) output by the lock-up control valve 7.

As described above, by providing the narrowed portion C, the supply or discharge rate of the oil OL to or from the sleeve 70 can be controlled to a rate at which the sudden displacement of the valve body 79 can be avoided. Accordingly, a sudden change in the lock-up control pressure can be avoided and the controllability of the lock-up device can be improved.

(4) The torque converter control valve 8 is a switching valve that switches a supply path of the oil OL having the line pressure as a source pressure according to the oil OL supplied to the oil chamber R2 (piston oil chamber).

In a case of the lock-up control valve 7 or the torque converter control valve 8 that receives the supplied pressure regulated by the two-way valve instead of that of the actuator ACT (see FIG. 6), it is easy to synchronize a timing of supplying the oil OL into the oil chamber R2 with the switching of the supply path of the oil OL supplied to the torque converter T/C.

When the two-way valve is eliminated and the lock-up control valve 7 driven by the actuator ACT is adopted, it is necessary to adjust the switching of the supply path of the oil OL by the torque converter control valve 8 to conform to a supply timing of the oil OL to the oil chamber R2.

As described above, by inputting the oil OL supplied from the lock-up control valve 7 to the oil chamber R2 and the torque converter control valve 8 switching the supply path of the oil OL, it is easy to synchronize the timing of supplying the oil OL into the oil chamber R2 with the switching of the supply path of the oil OL supplied to the torque converter T/C.

Accordingly, it is unnecessary to ensure the amount of the oil OL, unlike the case where a two-way valve is used. That is, the amount of oil necessary for driving the lock-up control valve 7 can be reduced, and thus the load of the oil pump OP can be reduced.

(5) The torque converter control valve 8 includes
the valve body 89 that is displaceable in the direction of the axis X8,
the spring Sp2 (urging member) that applies an operation force that causes the valve body 89 to displace to the third valve position on one side in the direction of the axis X8 to the valve body 89,
the first port P81 (sixth port) to which the oil OL having the line pressure PL as a source pressure is supplied,
the eighth port P88 (seventh port) that communicates with the first oil passage 91,
the second port P82 (eighth port) that communicates with the second oil passage 92,
the fifth port P85 (ninth port) that communicates with the third oil passage 93, the discharge port E81 (tenth port) that communicates with the fourth oil passage 94 connected to the oil cooler, the sixth port P86 (eleventh port) that communicates with the second oil passage 92, and the seventh port P87 (twelfth port) that communicates with the third oil passage 93.

The valve body 89 of the torque converter control valve 8 is displaceable between the third valve position and the fourth valve position, the third valve position allowing the first port P81 and the discharge port E81 to communicate with each other, the fourth valve position allowing the first port P81 and the second port P82 to communicate with each other and the fifth port P85 and the discharge port E81 to communicate with each other.

The oil OL flowing in from the eighth port P88 applies, to the valve body 89 of the torque converter control valve 8, an urging force that causes the valve body 89 of the torque converter control valve 8 to displace toward the third valve position.

The oil OL flowing in from the sixth port P86 and the oil OL flowing in from the seventh port P87 apply, to the valve body 89, an urging force that causes the valve body 89 to displace toward the fourth valve position.

That is, the valve body 89 includes the wall portions 893 and 894 between the large-diameter portion 891 and the large-diameter portion 892 in the direction of the axis X8. Between the large-diameter portion 891 and the wall portion 893, between the wall portion 893 and the wall portion 894, and between the wall portion 894 and the large-diameter portion 892 are small-diameter portions 895, 896, and 897 into which the oil OL can flow, respectively.

When the valve body 89 is disposed at the third valve position, the small-diameter portions 896 and 897 are disposed at a position allowing the first port P81 and the discharge port E81 to communicate with each other.

When the valve body 89 is disposed at the fourth valve position, the small-diameter portion 897 is disposed at a position allowing the first port P81 and the second port P82 to communicate with each other, and the small-diameter portion 895 is disposed at a position allowing the fifth port P85 and the discharge port E81 to communicate with each other.

With such a configuration, when the hydraulic pressure (lock-up control pressure) for bringing the lock-up device 2 into the engaged state is supplied to the eighth port P88, the valve body 89 displaces toward the third valve position and is disposed at the third valve position (see FIG. 4).

Thus, the first port P81 and the discharge port E81 communicate with each other, and the oil having the line pressure as a source pressure is supplied to the oil cooler side.

The urging force of the oil OL flowing into the sleeve 80 via the sixth port P86 and the seventh port P87 is set to be larger than the urging force of the spring Sp2.

Therefore, when the supply of the hydraulic pressure (lock-up control pressure) to the eighth port P88 is shut off, the valve body 89 enters a state of being urged toward the third valve position only by the urging force of the spring Sp2.

Thus, the valve body 89 displaces to the plug P side by the urging force of the oil OL flowing into the sleeve 80 via the sixth port P86 and the seventh port P87. Finally, the valve body 89 is disposed at a position (fourth valve position) where the other end 89b is in contact with the plug P (see FIG. 5).

When the valve body is disposed at the fourth valve position, the first port P81 and the second port P82 communicate with each other, while the communication between the first port P81 and the discharge port E81 is shut off, and thus all of the oil OL having the line pressure as a source pressure is supplied into the torque converter T/C.

The fifth port P85 communicating with the third oil passage 93 communicates with the discharge port E81, and the oil passing through the torque converter T/C is supplied to the oil cooler. Accordingly, oil heated by agitation in the torque converter is cooled by the oil cooler, and thus a temperature rise of the oil can be avoided.

Further, the pressure of the oil OL supplied to the torque converter T/C and the pressure of the oil OL discharged from the torque converter T/C apply, to the valve body 89, an urging force that causes the valve body 89 to displace to the other side (fourth valve position side) in the direction of the axis X8.

Thus, at a timing when the lock-up device 2 is switched from the engaged state to the released state, the oil OL supplied into the torque converter T/C applies, to the valve body 89, an operation force that causes the valve body 89 to displace to the other side (fourth valve position side). Accordingly, the valve body 89 is smoothly moved from the third valve position to the fourth valve position.

When the valve body 89 smoothly moves to the fourth valve position, the pressure in the oil chamber R1 of the torque converter T/C rapidly increases. Immediately after the lock-up device 2 is switched from the engaged state to the released state, the pressure in the oil chamber R1 of the torque converter T/C is low and the pressure in the oil chamber R2 is high. Therefore, when a rise of the pressure in the oil chamber R1 of the torque converter T/C is delayed, there is a possibility that the piston 43 displaces in a direction of engaging the outer diameter side friction plate 411 and the inner diameter side friction plate 421 due to a pressure difference between the oil chamber R2 and the oil chamber R1 of the torque converter T/C.

With such a configuration described above, the pressure in the oil chamber R1 of the torque converter T/C rapidly increases, whereby an unintended displacement of the piston 43 can be suitably prevented.

Part of the oil OL returned from the oil chamber R1 of the torque converter T/C flows in from the seventh port P87 (fifteenth port) and is applied to the valve body 89. When the pressure in the oil chamber R1 of the torque converter T/C increases, the operation force that causes the valve body 89 to displace toward the third valve position increases, and the opening area of the second port P82 (eighth port) is narrowed. When the pressure in the oil chamber R1 of the torque converter T/C is reduced, the operation force that causes the valve body 89 to displace toward the third valve position is reduced, and the opening area of the second port P82 (eighth port) is increased.

That is, the opening area of the second port P82 (eighth port) that regulates the amount of the oil OL supplied to the torque converter T/C is adjusted according to the pressure in the oil chamber R1 of the torque converter T/C, and thus the pressure in the oil chamber R1 of the torque converter T/C can be appropriately adjusted.

Accordingly, by controlling the pressure in the oil chamber R1 of the torque converter T/C, an increase in the line pressure as a source pressure can be prevented.

Thus, in the case where the hydraulic circuit 6 is a hydraulic circuit of a transmission for a vehicle and the oil pump OP is driven by the rotational driving force of the driving source, the load on the driving source of the vehicle equipped with the transmission can be reduced. Accordingly, the improvement in fuel efficiency of the vehicle can be expected. In addition, in the case where the oil pump is an electric oil pump, the improvement in power consumption (electric power efficiency) in the vehicle equipped with the transmission can be expected.

(6) The torque converter control valve 8 includes
the third port P83 (thirteenth port) that communicates with the connection path 923,
the fourth port P84 (fourteenth port) that communicates with the branch path 924 branched from the connection path 923, and
the discharge port E82 (fifteenth port) that communicates with the fifth oil passage 95.

The connection path 923 is connected to the second oil passage 92 via the narrowed portion C, and the branch path 924 branched from the connection path 923 branches from a region between the narrowed portion C in the connection path 923 and the third port P83.

When the valve body 89 of the torque converter control valve 8 is disposed at the third valve position (see FIG. 4), the valve body 89 allows the first port P81 (sixth port) and the third port P83 (thirteenth port) to communicate with each other, allows the fourth port P84 (fourteenth port) and the discharge port E81 (tenth port) to communicate with each other, and further allows the fifth port P85 (ninth port) and the discharge port E82 (fifteenth port) to communicate with each other.

With such a configuration, when the valve body 89 is disposed at the third valve position, most of the oil OL having the line pressure as a source pressure is supplied to the oil cooler side, and part of the oil OL is supplied to the second oil passage 92 through the narrowed portion C. Accordingly, the amount of the oil OL supplied into the torque converter T/C is reduced, and the pressure of the oil OL in the oil chamber R1 can be reduced. Accordingly, the pressure in the oil chamber R2, that is, the pressure of the oil OL for maintaining the lock-up state (lock-up control pressure) can be reduced, and thus an increase in the line pressure, which is a source pressure, can be avoided, and deterioration in fuel efficiency can be reduced.

When the lock-up device 2 is brought into the released state, the pressure of the oil OL in the eighth port P88 is reduced. Thus, a balance of the forces applied to the valve body 89 changes.

Specifically, in the valve body 89, the pressure of the oil OL in the eighth port P88 and the urging force of the spring Sp are applied in a direction in which the valve body 89 is caused to move to the third valve position side (right side in the drawing). Further, the pressure of the oil in the sixth port P86 and the pressure of the oil OL in the seventh port P87 are applied in a direction in which the valve body 89 is caused to move to the fourth valve position side (left side in the drawing).

Therefore, when the pressure of the oil OL in the eighth port P88 is reduced, the valve body 89 moves toward the fourth valve position at the time when the operation force determined according to the pressure of the oil OL in the eighth port P88 and the urging force of the spring Sp becomes smaller than the operation force determined according to the pressure of the oil in the sixth port P86 and the pressure in the seventh port P87. As the pressure of the oil OL in the eighth port P88 is reduced, the valve body 89 finally reaches the fourth valve position.

When the valve body 89 is disposed at the fourth valve position, the first port P81 (sixth port) and the second port P82 (eighth port) communicate with each other, while the communication between the first port P81 (sixth port) and the discharge port E81 (tenth port) is shut off, and all of the oil having the line pressure as a source pressure is supplied into the torque converter T/C.

The fifth port P85 (ninth port) communicating with the third oil passage 93 communicates with the discharge port E82 (fifteenth port) communicating with the oil cooler, and the oil OL passing through the torque converter T/C is supplied to the oil cooler. Accordingly, the oil OL heated by the agitation in the torque converter T/C is supplied to the oil cooler and cooled, and thus a temperature rise of the oil OL can be avoided.

(7) In the torque converter control valve 8,
the narrowed portion C (oil flow rate regulating portion) is provided in each of the branch path 912 (connection path) connecting the first oil passage 91 and the eighth port P88 (seventh port), the branch path 922 (connection path) connecting the second oil passage 92 and the sixth port P86 (eleventh port), and the branch path 932 (connection path) connecting the third oil passage 93 and the seventh port P87 (twelfth port).

With such a configuration, the narrowed portion C regulates the flow rate of the oil OL such that the oil OL in the sleeve 80 is not suddenly discharged and the oil OL is not suddenly supplied into the sleeve 80. When a supply or discharge rate of the oil OL to or from the sleeve 80 is too fast, there is a possibility that a slight displacement (vibration) of the valve body 89 occurs, but the occurrence of the vibration can be prevented by providing the narrowed portion C.

Although the embodiment of the present invention has been described above, the above embodiment is merely an application example of the present invention and is not intended to limit the technical scope of the present invention to the specific configuration of the above embodiment.

The present application claims a priority of Japanese Patent Application No. 2022-032200 filed with the Japan Patent Office on Mar. 2, 2022, all the contents of which are hereby incorporated by reference.

DESCRIPTION OF REFERENCE SIGNS 6 hydraulic circuit
7 lock-up control valve
79 valve body
8 torque converter control valve
79 valve body
61 first pressure regulating valve (regulator valve)
91 first oil passage
92 second oil passage
93 third oil passage
94 fourth oil passage
95 fifth oil passage
923 connection path
924 branch path
ACT actuator
OL oil
OP oil pump (hydraulic pressure source)
D71 drain port
P71 first port
P72 second port
P73 third Port
P74 fourth Port
P75 fifth Port
P81 first port (sixth port)
P88 eighth port (seventh port)
P82 second port (eighth port)

P85 fifth port (ninth port)
E81 discharge port (tenth port)
P86 sixth port (eleventh port)
P87 seventh port (twelfth port)
P83 third port (thirteenth port)
P84 fourth port (fourteenth port)
E82 discharge port (fifteenth port)
C narrowed portion (flow rate regulating portion)
PL line pressure
R2 oil chamber (piston oil chamber)
Sp1 spring (urging member)
Sp2 spring (elastic member)
T/C torque converter

The invention claimed is:

1. A hydraulic circuit comprising:
a torque converter control valve configured to control oil supplied to a torque converter; and
a lock-up control valve configured to control oil supplied to a piston oil chamber of the torque converter,
the hydraulic circuit further comprising:
a second oil passage through which oil supplied from the torque converter control valve to the torque converter flows; and
a third oil passage through which oil discharged from the torque converter flows, wherein
the lock-up control valve includes
a valve body that is displaceable in an axial direction,
an actuator that causes the valve body to displace toward a first valve position on one side in the axial direction,
an urging member that causes the valve body to displace toward a second valve position on the other side in the axial direction,
a first port to which oil having a line pressure as a source pressure is supplied,
a second port that communicates with a first oil passage connected to the piston oil chamber,
a third port that communicates with the first oil passage,
a fourth port that communicates with the second oil passage,
a fifth port that communicates with the third oil passage, and
a drain port,
an oil flow rate regulating portion is provided in each of a connection path connecting the first oil passage and the third port, a connection path connecting the second oil passage and the fourth port, and a connection path connecting the third oil passage and the fifth port,
the valve body is displaceable between the first valve position and the second valve position, the first valve position allowing the first port and the second port to communicate with each other, the second valve position allowing the second port and the drain port to communicate with each other, and
oil flowing in from the third port urges the valve body toward the second valve position.

2. The hydraulic circuit according to claim 1, wherein
oil flowing in from the fourth port and oil flowing in from the fifth port urge the valve body toward the first valve position.

3. The hydraulic circuit according to claim 2, wherein
the torque converter control valve includes
a valve body that is displaceable in an axial direction, and
an elastic member that causes the valve body of the torque converter control valve to displace toward a third valve position on one side in the axial direction,
a sixth port to which the oil having the line pressure as a source pressure is supplied,
a seventh port that communicates with the first oil passage,
an eighth port that communicates with the second oil passage,
a ninth port that communicates with the third oil passage,
a tenth port that communicates with a fourth oil passage connected to an oil cooler,
an eleventh port that communicates with the second oil passage, and
a twelfth port that communicates with the third oil passage,
a valve body of the torque converter control valve is displaceable between the third valve position and a fourth valve position, the third valve position allowing the sixth port and the tenth port to communicate with each other, the fourth valve position allowing the sixth port and the eighth port to communicate with each other and the ninth port and the tenth port to communicate with each other,
oil flowing in from the seventh port urges the valve body of the torque converter control valve toward the third valve position, and
oil flowing in from the eleventh port and oil flowing in from the twelfth port urge the valve body toward the fourth valve position on the other side in the axial direction.

4. The hydraulic circuit according to claim 1, wherein
the torque converter control valve is
a switching valve that switches a supply path of the oil having the line pressure as a source pressure according to the oil supplied to the piston oil chamber.

5. A hydraulic circuit comprising:
a torque converter control valve configured to control oil supplied to a torque converter; and
a lock-up control valve configured to control oil supplied to a piston oil chamber of the torque converter,
the hydraulic circuit further comprising:
a second oil passage through which oil supplied from the torque converter control valve to the torque converter flows; and
a third oil passage through which oil discharged from the torque converter flows, wherein
the lock-up control valve includes
a valve body that is displaceable in an axial direction,
an actuator that causes the valve body to displace toward a first valve position on one side in the axial direction,
an urging member that causes the valve body to displace toward a second valve position on the other side in the axial direction,
a first port to which oil having a line pressure as a source pressure is supplied,
a second port that communicates with a first oil passage connected to the piston oil chamber,
a third port that communicates with the first oil passage, and
a drain port,
the valve body is displaceable between the first valve position and the second valve position, the first valve position allowing the first port and the second port to communicate with each other, the second valve position allowing the second port and the drain port to communicate with each other,
oil flowing in from the third port urges the valve body toward the second valve position,
the torque converter control valve includes
a valve body that is displaceable in an axial direction, an elastic member that causes the valve body of the torque converter control valve to displace toward a third valve position on one side in the axial direction,
a sixth port to which the oil having the line pressure as a source pressure is supplied,
a seventh port that communicates with the first oil passage,
an eleventh port that communicates with the second oil passage, and
a twelfth port that communicates with the third oil passage,
oil flowing in from the seventh port urges the valve body of the torque converter control valve toward the third valve position, and
oil flowing in from the eleventh port and oil flowing in from the twelfth port urge the valve body toward a fourth valve position on the other side in the axial direction.

6. The hydraulic circuit according to claim 5, wherein the lock-up control valve includes
a fourth port that communicates with the second oil passage, and
a fifth port that communicates with the third oil passage, and
oil flowing in from the fourth port and oil flowing in from the fifth port urge the valve body toward the first valve position.

7. The hydraulic circuit according to claim 6, wherein an oil flow rate regulating portion is provided in each of a connection path connecting the first oil passage and the third port, a connection path connecting the second oil passage and the fourth port, and a connection path connecting the third oil passage and the fifth port.

8. The hydraulic circuit according to claim 5, wherein the torque converter control valve includes
an eighth port that communicates with the second oil passage,
a ninth port that communicates with the third oil passage, and
a tenth port that communicates with a fourth oil passage connected to an oil cooler, and
a valve body of the torque converter control valve
causes the sixth port and the tenth port to communicate with each other at the third valve position, and
causes the sixth port and the eighth port to communicate with each other and the ninth port and the tenth port to communicate with each other at the fourth valve position.

9. The hydraulic circuit according to claim 8, wherein an oil flow rate regulating portion is provided in each of a connection path connecting the first oil passage and the seventh port, a connection path connecting the second oil passage and the eleventh port, and a connection path connecting the third oil passage and the twelfth port.

10. The hydraulic circuit according to claim 5, wherein the torque converter control valve includes
a thirteenth port that communicates with a connection path connected to the second oil passage via a narrowed portion,
a fourteenth port that communicates with a branch path branched from the connection path communicating with the thirteenth port, and
a fifteenth port that communicates with a fifth oil passage,
the branch path branched from the connection path is branched from a region between the thirteenth port and the narrowed portion in the connection path communicating with the thirteenth port, and
when the valve body of the torque converter control valve is disposed at the third valve position, the valve body allows the sixth port and the thirteenth port to communicate with each other, allows the fourteenth port and the tenth port to communicate with each other, and further allows the ninth port and the fifteenth port to communicate with each other.

* * * * *